United States Patent [19]
Julier

[11] Patent Number: 6,009,191
[45] Date of Patent: *Dec. 28, 1999

[54] COMPUTER IMPLEMENTED METHOD FOR COMPRESSING 48-BIT PIXELS TO 16-BIT PIXELS

[75] Inventor: Michael A. Julier, Phoenix, Ariz.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/602,009

[22] Filed: Feb. 15, 1996

[51] Int. Cl.$^6$ .............................. G06K 9/00; G06K 9/36
[52] U.S. Cl. ...................... 382/166; 345/155; 345/506; 345/524; 382/303
[58] Field of Search .................... 345/153, 155, 345/197, 202, 186, 191, 505, 506, 509, 522; 382/166, 232, 298, 162, 234, 283, 303, 304; 395/513, 523, 524, 114; 348/391, 393, 453; 358/517, 539

[56] References Cited

U.S. PATENT DOCUMENTS

| | | | |
|---|---|---|---|
| 3,711,692 | 1/1973 | Batcher | 235/175 |
| 3,723,715 | 3/1973 | Chen et al. | 235/175 |
| 4,161,784 | 7/1979 | Cushing et al. | 364/748 |
| 4,393,468 | 7/1983 | New | 364/736 |
| 4,418,383 | 11/1983 | Doyle et al. | 364/200 |
| 4,498,177 | 2/1985 | Larson | 371/52 |
| 4,633,483 | 12/1986 | Takahashi et al. | 375/25 |
| 4,707,800 | 11/1987 | Montrone et al. | 364/788 |
| 4,712,140 | 12/1987 | Mintzer et al. | 382/298 |
| 4,771,379 | 9/1988 | Ando et al. | 364/200 |
| 4,821,208 | 4/1989 | Ryan et al. | 345/153 |
| 4,823,281 | 4/1989 | Evangelisti et al. | 364/518 |
| 4,989,168 | 1/1991 | Kuroda et al. | 364/715.09 |
| 5,029,105 | 7/1991 | Coleman et al. | 345/153 |
| 5,095,457 | 3/1992 | Jeong | 364/758 |
| 5,187,679 | 2/1993 | Vassiliadis et al. | 364/786 |
| 5,218,431 | 6/1993 | Gleicher et al. | 358/13 |
| 5,230,039 | 7/1993 | Grossman et al. | 345/430 |
| 5,250,934 | 10/1993 | Denber et al. | 345/197 |
| 5,262,968 | 11/1993 | Coffield | 364/604 |
| 5,287,420 | 2/1994 | Barrett | 382/56 |
| 5,446,831 | 8/1995 | Yamashita et al. | 395/102 |
| 5,469,190 | 11/1995 | Masterson | 345/155 |

OTHER PUBLICATIONS

R.B. Lee, Accelerating Multimedia With Enhanced Microprocessors, IEEE Micro, Apr. 1995, pp. 22–32.

Motorola, MC88110 User's Manual, 1991, pp. 5–11.

Sun Microsystems, SPARC Technology Business, UltraSPARC Multimedia Capabilities On–Chip Support for Real–Time Video and Advanced Graphics, Sep. 1994, p. 4 and Fig. 4A.

(List continued on next page.)

*Primary Examiner*—Amelia Au
*Assistant Examiner*—Timothy M. Johnson
*Attorney, Agent, or Firm*—Blakely, Sokoloff, Taylor & Zafman LLP

[57] ABSTRACT

The present invention provides a method, in a computer system, for compressing bit formats provided in a first packed data sequence. One embodiment of the method comprises the steps of generating, in response to execution of a first instruction, a second packed data sequence by copying the first packed data sequence. A second step of replacing, in response to execution of a second instruction, a first portion of the second packed data sequence with a second portion of the second packed data sequence. A third step of generating, in response to execution of a third instruction, an intermediate result, by multiplying data elements of the first packed data sequence with corresponding data elements of a third packed data sequence, and adding adjacent products. A fourth step of performing, in response to execution of a fourth instruction, a first shift operation, wherein bits of the second packed data sequence are shifted. A fifth step of generating, in response to execution of a fifth instruction, a final result by performing a bit wise logical OR operation between the second packed data sequence and the intermediate results.

37 Claims, 15 Drawing Sheets

OTHER PUBLICATIONS

J. Shipnes, *Graphics Processing with the 88110 RISC Microprocessor*, IEEE (1992), pp. 169–174.

*MC88110 Second Generation RISC Microprocessor User's Manual,* Motorola Inc. (1991).

*Errata to MC88110 Second Generation RISC Microprocessor User's Manual,* Motorola Inc. (1992), pp. 1–11.

*MC88110 Programmer's Reference Guide,* Motorola Inc. (1992), pp. 1–4.

*i860™ Microprocessor Family Programmer's Reference Manual,* Intel Corporation (1992), Ch. 1, 3, 8, 12.

*TMS320C2x User's Guide,* Texas Instruments (1993) pp. 3–2 through 3–11; 3–28 through 3–34; 4–1 through 4–22; 4–41; 4–103; 4–119 through 4–120; 4–122; 4–150 through 4–151.

L. Gwennap, *New PA–RISC Processor Decodes MPEG Video*, Microprocessor Report (Jan. 1994), pp. 16, 17.

SPARC Technology Business, UltraSPARC Multimedia Capabilities On–Chip Support for Real–Time Video and Advanced Graphics, Sun Microsystems (Sep. 1994).

Y. Kawakami et al., *LSI Applications: A Single–Chip Digital Signal Processor for Voiceband Applications*, Solid State Circuits Conference, Digest of Technical Papers; IEEE International (1980).

B. Case, *Philips Hopes to Displace DSPs with VLIW*, Microprocessor Report (Dec. 1994), pp. 12–18.

N. Margulis, *i860 Microprocessor Architecture,* McGraw Hill, Inc. (1990) Ch. 6, 7, 8, 10, 11.

*Pentium Processor User's Manual, vol. 3: Architecture and Programming Manual,* Intel Corporation (1993), Ch. 1, 3, 4, 6, 8, and 18.

FIG. 3a

| 63 | 56 55 | 48 47 | 40 39 | 32 31 | 24 23 | 16 15 | 8 7 | 0 |
|---|---|---|---|---|---|---|---|---|
| bbbb bbbb | bbbb bbbb | bbbb bbbb | bbbb bbbb | bbbb bbbb | bbbb bbbb | bbbb bbbb | bbbb bbbb | |

Unsigned Packed Byte In-register Representation 310

| 63 | 56 55 | 48 47 | 40 39 | 32 31 | 24 23 | 16 15 | 8 7 | 0 |
|---|---|---|---|---|---|---|---|---|
| sbbb bbbb | sbbb bbbb | sbbb bbbb | sbbb bbbb | sbbb bbbb | sbbb bbbb | sbbb bbbb | sbbb bbbb | |

Signed Packed Byte In-register Representation 311

FIG. 3b

```
63                    48 47                    32 31                    16 15                     0
wwww wwwww wwwww    wwww wwwww wwwww         wwww wwwww wwwww          wwww wwwww wwwww
```
Unsigned Packed Word In-register Representation 312

```
63                    48 47                    32 31                    16 15                     0
swww wwwww wwwww    swww wwwww wwwww         swww wwwww wwwww          swww wwwww wwwww
```
Signed Packed Word In-register Representation 313

FIG. 3c

```
63                                           32 31                                               0
dddd dddd dddd dddd dddd dddd dddd dddd      dddd dddd dddd dddd dddd dddd dddd dddd
```
Unsigned Packed Doubleword In-register Representation 314

```
63                                           32 31                                               0
sddd dddd dddd dddd dddd dddd dddd dddd      sddd dddd dddd dddd dddd dddd dddd dddd
```
Signed Packed Doubleword In-register Representation 315

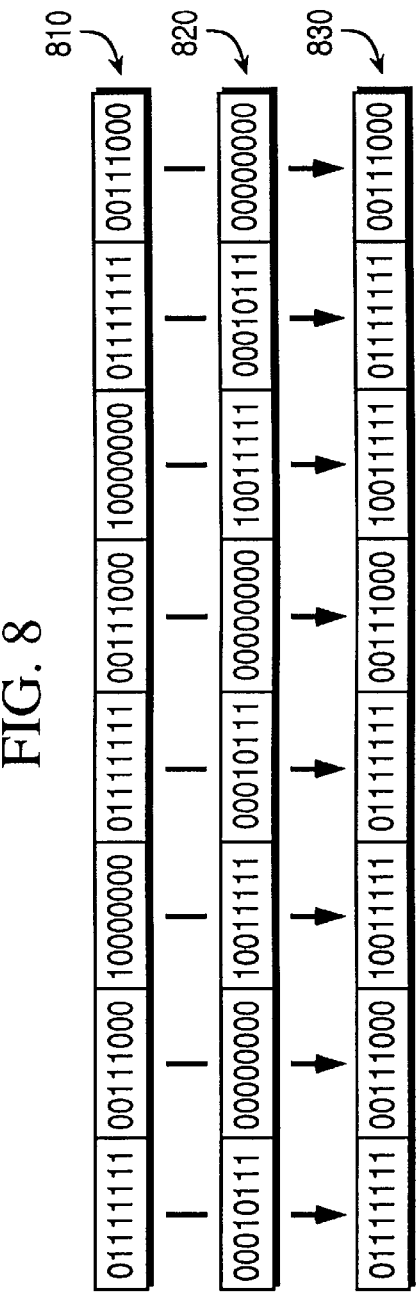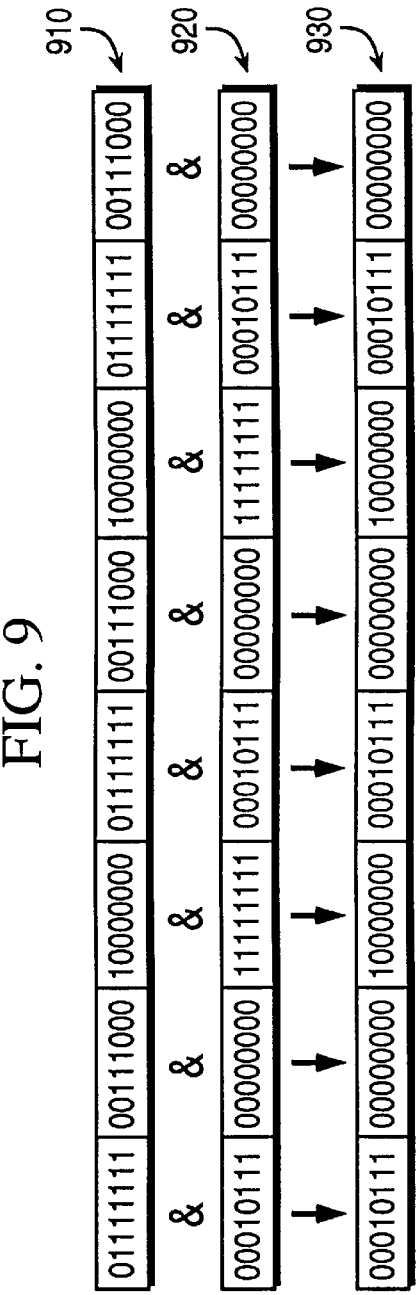

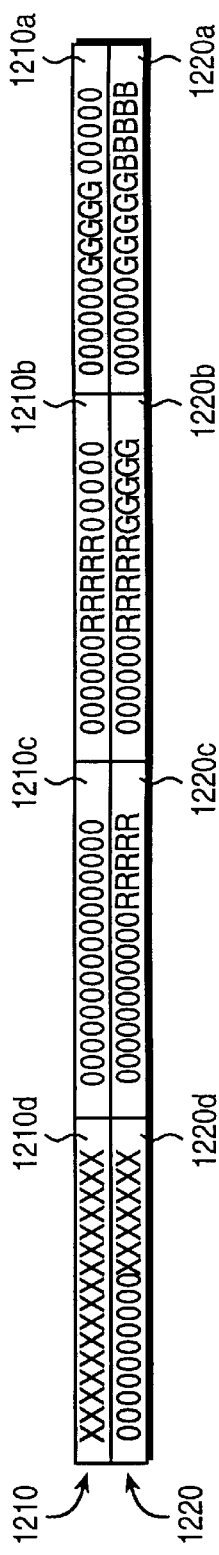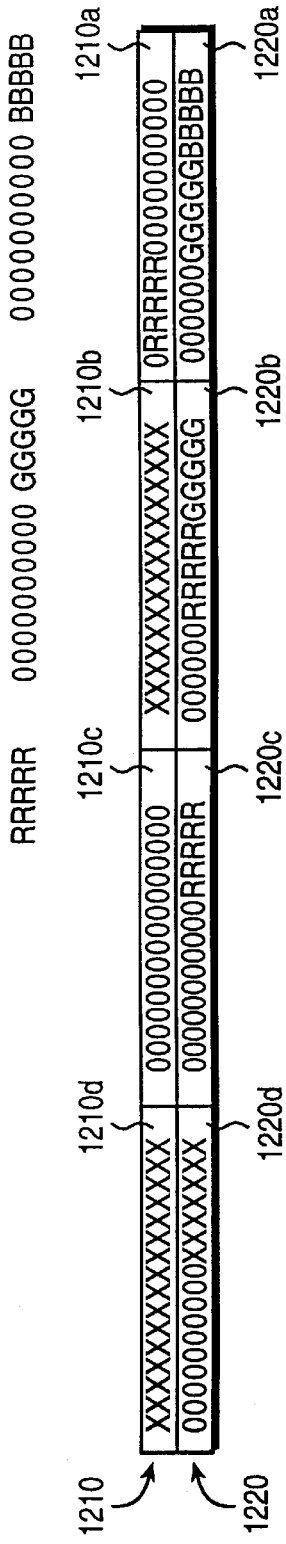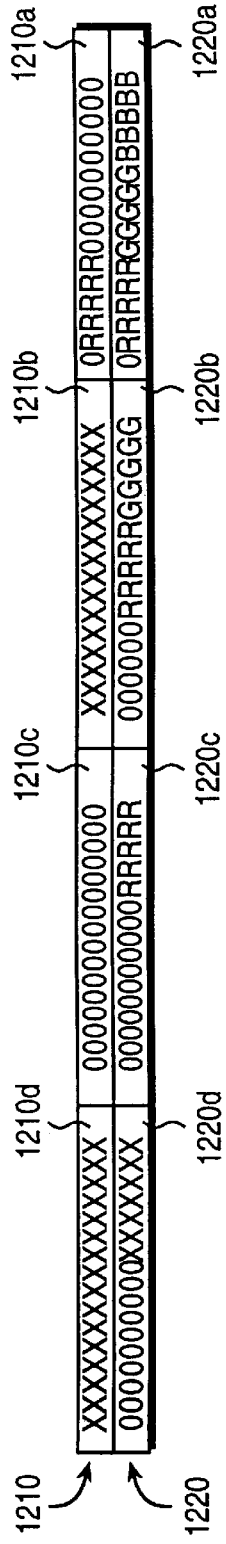

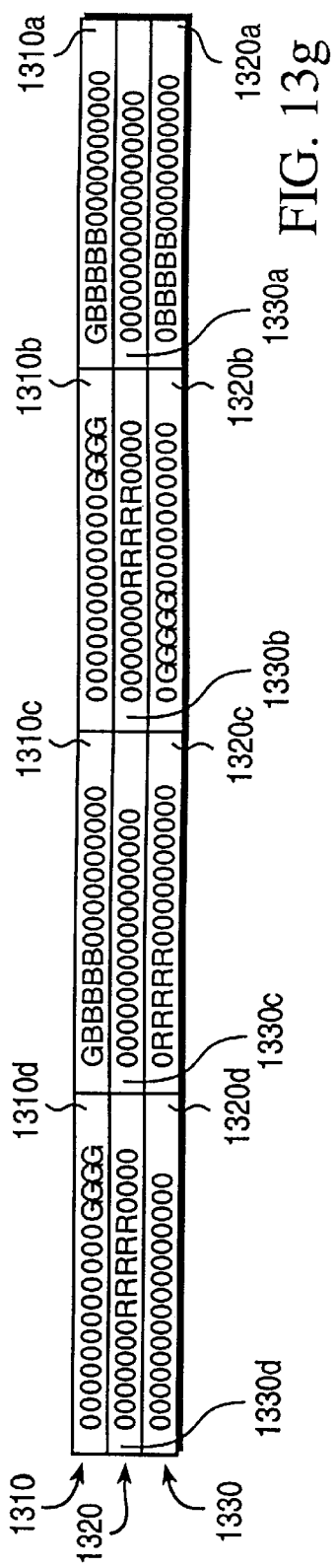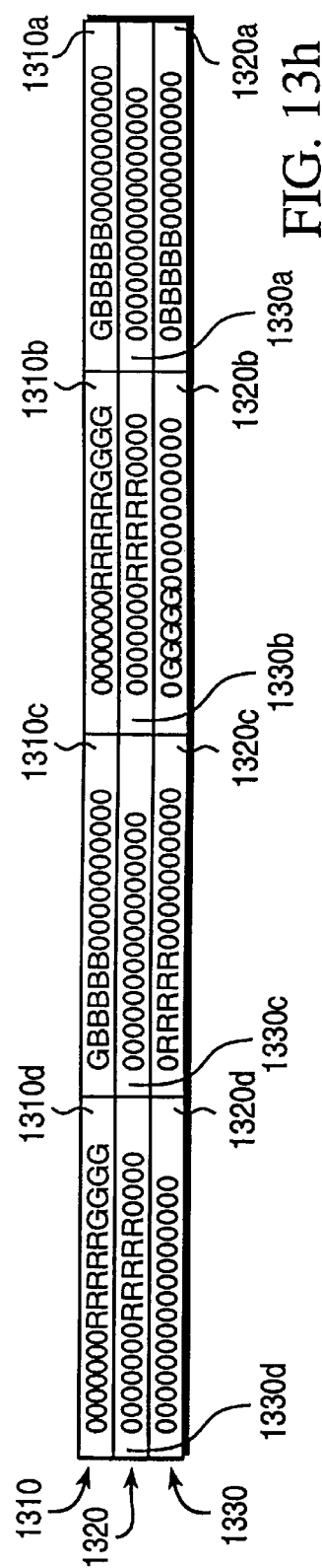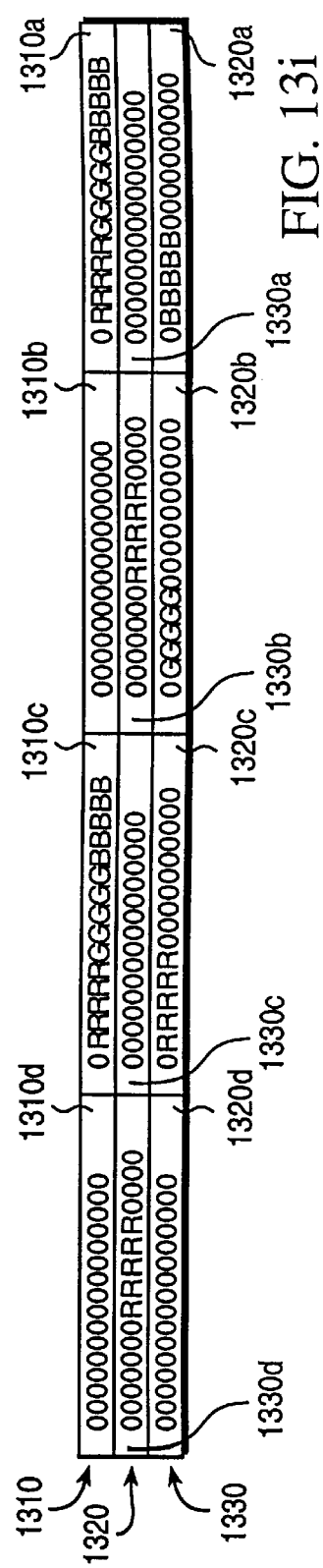

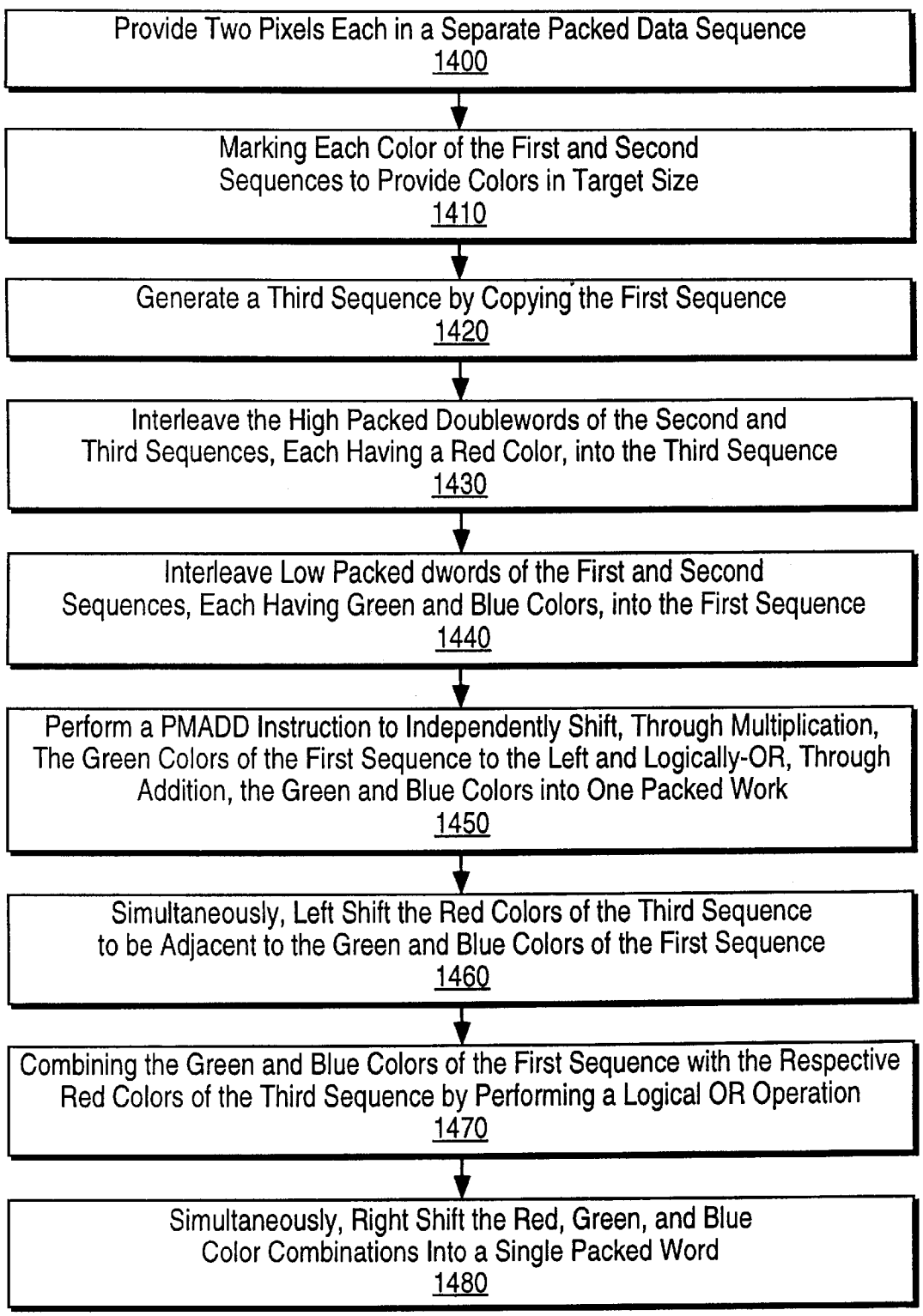

COMPUTER IMPLEMENTED METHOD FOR COMPRESSING 48-BIT PIXELS TO 16-BIT PIXELS

BACKGROUND OF THE INVENTION

1. Field of the Invention

The invention relates to computers and, more specifically, to the processing of pixel data values.

2. Description of Related Art

Images displayed on computer monitors are generated by joining many miniature picture elements commonly referred to as pixels. The pixels are represented in a variety of formats. The most common pixel formats are 8-bit, 16-bit, and 24-bit.

The format used varies based upon such factors as the monitor, the graphics card, and the amount of memory intended to be used. Some of the formats are based on a combination of red, green, and blue values. For example, a twenty-four-bit pixel format is typically composed of eight bits of red data, eight bits of green data, and eight bits of blue data. The format is commonly referred to as an 8/8/8 format following Red/Green/Blue, and is a common pixel format used for storing the pixel bits in a memory array.

Not all color pixel formats, however, are based on a combination of the colors red, green, and blue. The 8-bit format is often referred to as a Color Look Up Table (CLUT index). In this case, each 8-bit pixel is an index into an array of 256 arbitrary colors. However, in the remainder of the present application, in order not to obscure the present invention, it will be assumed that pixels are provided as red, green, and blue bits.

Twenty-four-bit pixel colors are considered to be very expensive for storage and generating images on a color monitor. As a result, there continues to be an abundance of video displays that require 16-bit pixels. As such, when an image represented by twenty-four-bit pixels is input into a computer system (e.g., scanned), it is typically compressed into sixteen-bit pixel formats before it is stored or can be generated as an image to be displayed on a monitor.

Moreover, some colored pixels are generated from a graphics pipeline, which involves a real time processing procedure for transforming a three-dimensional image into a two-dimensional image to be displayed on a computer monitor. In the pipeline, 48-bit pixels are generated, wherein 16-bits represent each red, green, and blue color. As such, pixels generated from the graphics pipeline need to be compressed from 48-bit pixels to 16-bit pixels.

The graphics pipeline is usually composed of two main pieces, a "geometry engine" and a "renderer". The purpose of the geometry engine is to build a three-dimensional image from its base parts. The purpose of the renderer is to take the created three-dimensional image and convert it to a two-dimensional image to be displayed on a monitor. More specifically, the geometry engine starts with a list of vertices and edges, connects the vertices and generates polygons (e.g., squares, triangles, hexagons) representing the three-dimensional image.

Once the three-dimensional image is generated, it is passed to the renderer. As stated, the renderer is responsible for generating a two-dimensional version of the three-dimensional image, so as to be displayed on a monitor. One process of the renderer is referred to as "culling", which involves eliminating the areas of a three dimensional image that would not be visible in a two-dimensional image. For example, consider the image of a building as seen from across a street, everything behind the face of the building would be eliminated because it would not be visible in a two-dimensional image.

In the next stage of the graphics pipeline, the renderer begins to generate the colors of an image. Some parts of an image may consist of a solid color and require the relatively simple process of generating the solid color. For example, the color of a clear flat blue sky would involve the simple process of generating the single flat blue color of the sky.

Other areas of an image, however, may involve complex processing. For example, the color of a window in the building would be determined by considering the amount of light on each side of the window, the angle of the view presenting the window, any image viewed on the inside of the window, and any possible reflection off the window. Moreover, it is possible to generate an area of the window so that, simultaneously, an item can be seen behind the window, and a reflection can appear on the outside of the window.

Calculating the color of such an image requires a high degree of precision and takes a much different path than the "flat shaded" blue sky. As a result, 16-bits are used to represent each red, green, and blue color of a pixel in the graphics pipeline, thereby presenting a 48-bit pixel when generating a complex color for an image. However, as previously explained, the pixels need to be compressed into 16-bit pixels for efficient storage and to be displayed on monitors.

Moreover, the fact that the graphics pipeline is an on-line real time process means that it is very performance-sensitive. Any slowdown in the pipeline process would result in slower video playback, less stunning graphics in video games, or some other related detraction from the visual experience.

Typically, in order to compress the 48-bit pixels into 16-bit pixels, each red, green, or blue color would be loaded into separate 32-bit registers. Multiple shift, copy, load, and logical OR instructions would be executed to individually compress the separate colors and join the compressed colors into one register to represent one 16-bit pixel.

Advancements in computer architecture, however, provide an ability to process small integer data values more efficiently. More specifically, the advancements include the ability to process multiple small integer data values in parallel in response to a single instruction, otherwise referred to as a Single Instruction Multiple Data, hereinafter referred to as an SIMD. The multiple data elements are joined together as packed data sequences. The packed data sequences provide a single data structure storing of up to sixty-four-bits of integer data in one register, wherein the sequence includes multiple data elements of equal size.

Therefore, what is needed is an accelerated method for accepting 48-bit pixels generated by a graphics pipeline and compressing the pixels to 16-bit pixels, by using 64-bit packed data sequences and related SIMD instructions, so as to enhance the visual experience of displaying an image generated by a graphics pipeline.

SUMMARY OF THE INVENTION

The present invention provides a method, in a computer system, for compressing bit formats provided in a first packed data sequence. One embodiment of the method comprises the steps of generating, in response to execution of a first instruction, a second packed data sequence by copying the first packed data sequence. A second step of replacing, in response to execution of a second instruction, a first portion of the second packed data sequence with a second portion of the second packed data sequence. A third step of generating, in response to execution of a third instruction, an intermediate result, by multiplying data elements of the first packed data sequence with corresponding data elements of a third packed data sequence, and adding adjacent products. A fourth step of performing, in response to execution of a fourth instruction, a first shift operation, wherein bits of the second packed data sequence are shifted. A fifth step of generating, in response to execution of a fifth instruction, a final result by performing a bit wise logical OR operation between the second packed data sequence and the intermediate results.

BRIEF DESCRIPTION OF THE DRAWINGS

FIG. 3a illustrates in-register packed byte representations according to one embodiment of the invention.

FIG. 3b illustrates in-register packed word representations according to one embodiment of the invention.

FIG. 3c illustrates in-register packed double word representations according to one embodiment of the invention.

FIG. 8 illustrates the packed bit-wise logical OR operation used in one embodiment in the method of the present invention.

FIG. 9 illustrates the packed bit-wise logical AND operation used in one embodiment in the method of the present invention.

FIG. 14 illustrates a block diagram of the steps used in a second embodiment of the method of the present invention.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Computer System of the Invention

Figure 1:
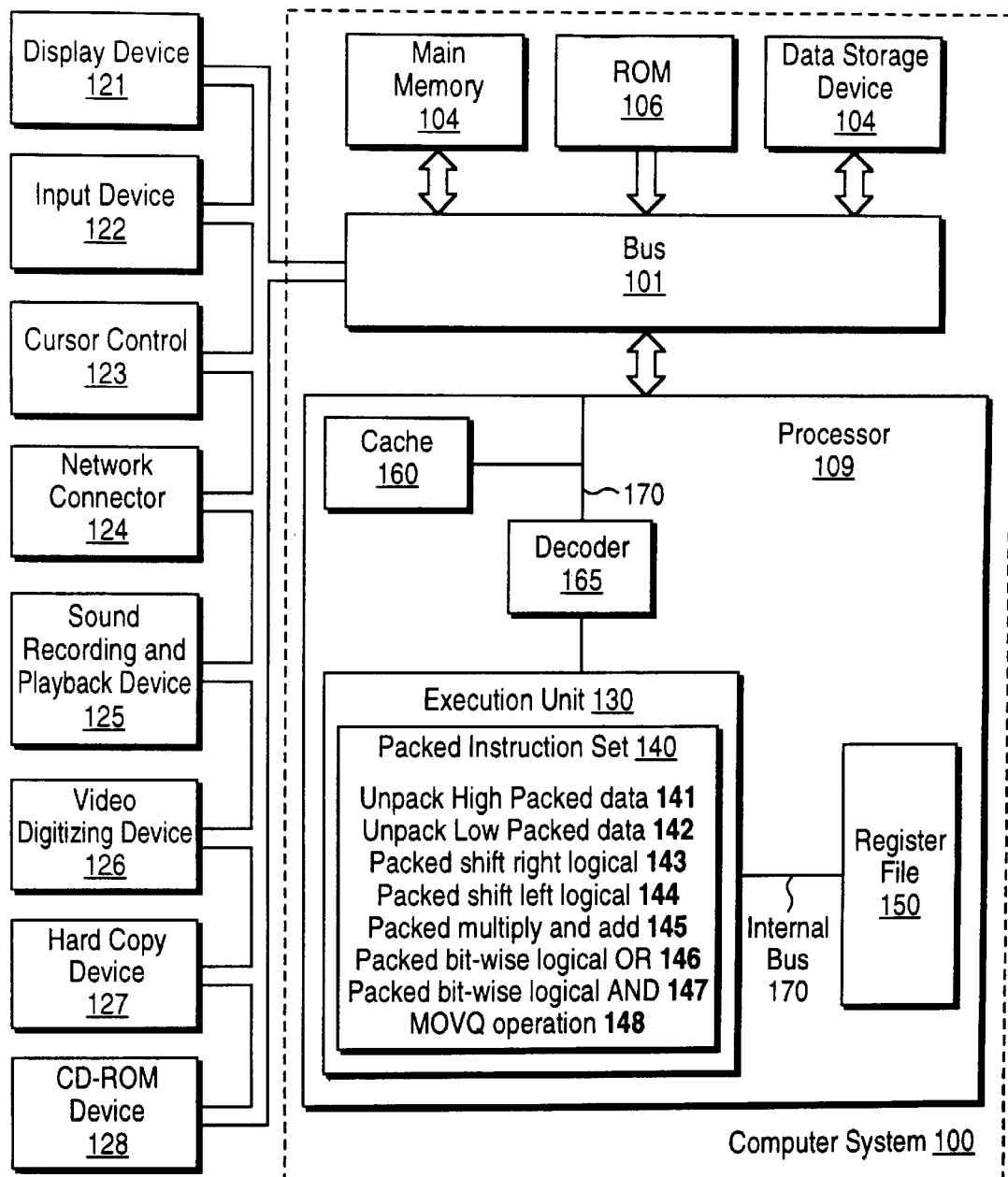
FIG. 1 illustrates a computer system capable of implementing one embodiment of the present invention.

FIG. 1 shows a computer system 100 upon which one embodiment of the present invention could be implemented. Computer system 100 comprises a bus 101 for communicating information, processor 109 coupled to bus 101 for processing information, and memory subsystem 104–107 coupled to bus 101 for storing information and instructions for processor 109.

Figure 11:
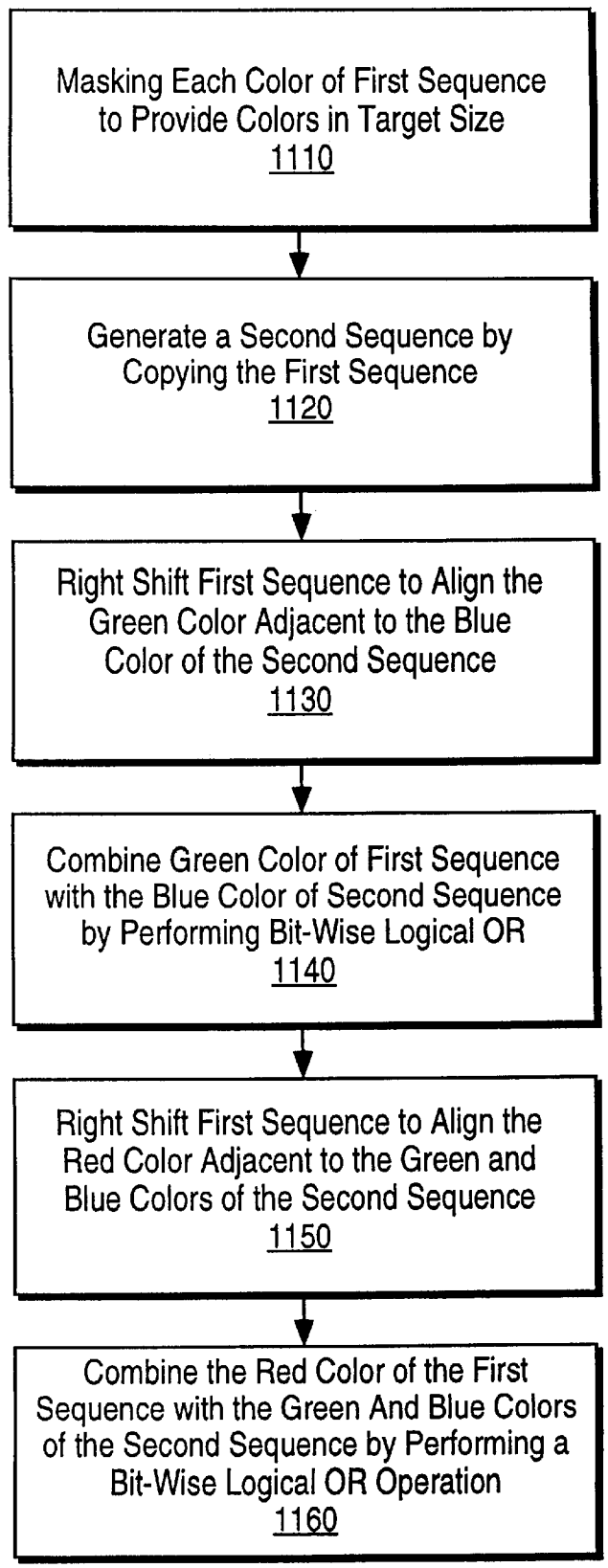
FIG. 11 illustrates in-register packed data representation of the steps used in one embodiment in the method of the present invention.

Processor 109 includes an execution unit 130, a register file 150, a cache memory 160, a decoder 165, and an internal bus 170. Cache memory 160, storing frequently and/or recently used information for processor 109, is coupled to execution unit 130. Register file 150 stores information in processor 109 and is coupled to execution unit 130 via internal bus 170. In one embodiment of the invention, register file 150 includes multimedia registers 151 for storing multimedia information, as illustrated in FIG. 11 and FIG. 13. In one embodiment, multimedia registers 151 each store up to sixty-four bits of packed data. Multimedia registers 151 may be dedicated multimedia registers or registers which are used for storing multimedia information and other information. In one embodiment, multimedia registers 151 store multimedia data when performing multimedia operations and store floating point data when performing floating point operations.

Execution unit 130 operates on packed data according to the instructions received by processor 109 that are included in packed instruction set 140. Execution unit 130 also operates on scalar data according to instructions implemented in general-purpose processors. Processor 109 is capable of supporting the Pentium® microprocessor instruction set and the packed instruction set 140. By including packed instruction set 140 into a standard microprocessor instruction set, such as the Pentium® microprocessor instruction set, packed data instructions can be easily incorporated into existing software (previously written for the standard microprocessor instruction set). Other standard instruction sets, such as the PowerPC™ and the Alpha® processor instruction sets may also be used in accordance with the described invention. (Pentium® is a registered trademark of Intel Corporation. PowerPC™ is a trademark of IBM, APPLE COMPUTER, and MOTOROLA. Alpha™ is a trademark of Digital Equipment Corporation.)

In one embodiment, packed instruction set 140 includes instructions for executing an unpack High Packed data (PUNPCKH) 141, an Unpack Low Packed data (PUNPCKL) 142, a packed shift right logical (PSRL) 143, a packed shift left logical (PSLL) 144, a packed multiply and add (PMADD) 145, a packed bit-wise logical OR (POR) 146, a packed bit-wise logical AND (PAND) 147, and a MOVQ operation 148.

By including packed instruction set 140 in the instruction set of general-purpose processor 109 along with associated circuitry to execute the instructions, the operations used by many existing multimedia applications may be performed using packed data in a general-purpose processor. Thus, many multimedia applications may be accelerated and executed more efficiently by using the full width of a processor's data bus for performing operations on packed data. This eliminates the need to transfer smaller units of data across the processor's data bus to perform one or more operations one data element at a time.

Still referring to FIG. 1, the computer system 100 of the present invention may include a display device 121 such as a monitor. The display device 121 may include an intermediate device such as a frame buffer. The computer system 100 includes an input device 122 such as a keyboard, and a cursor control 123 such as a mouse, or trackball, or trackpad. The display device 121, the input device 122, and the cursor control 123 are coupled to bus 101. Computer system 100 may also include a network connector 124 such that computer system 100 is part of a local area network (LAN) or a wide area network (WAN).

Additionally, computer system 100 can be coupled to a device for sound recording, and/or playback 125, such as an audio digitizer coupled to a microphone for recording voice input for speech recognition. Computer system 100 may also include a video digitizing device 126 that can be used to capture video images, a hard copy device 127 such as a printer, and a CD-ROM device 128. The devices 124–128 are also coupled to bus 101.

Data and Storage Formats

Figure 2:
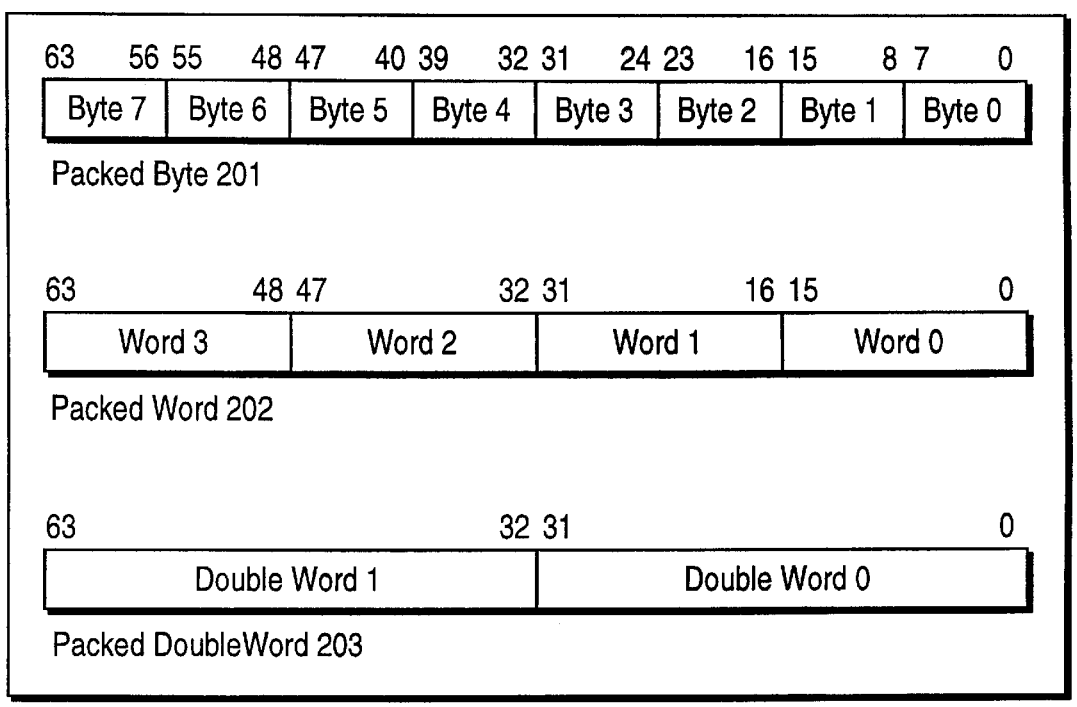
FIG. 2 illustrates packed data-types according to one embodiment of the invention.

FIG. 2 illustrates three packed data-types: packed byte 201, packed word 202, and packed doubleword (dword) 203. Packed byte 201 is sixty-four bits long containing eight packed byte data elements. Generally, a data element is an individual piece of data that is stored in a single register (or memory location) with other data elements of the same length. In packed data sequences, the number of data elements stored in a register is sixty-four bits divided by the length in bits of a data element.

Packed word 202 is sixty-four bits long and contains four packed word data elements. Each packed word contains sixteen bits of information.

Packed doubleword 203 is sixty-four bits long and contains two packed doubleword data elements. Each packed doubleword data element contains thirty-two bits of information. A packed quadword is 64-bits long and contains one packed quadword data element.

FIGS. 3a through 3c illustrate the in-register packed data storage representation according to one embodiment of the invention. Unsigned packed byte in-register representation 310 illustrates the storage of an unsigned packed byte 201 in one of the multimedia registers 151, as shown in FIG. 3a. Information for each byte data element is stored in bit seven through bit zero for byte zero, bit fifteen through bit eight for byte one, bit twenty-three through bit sixteen for byte two, bit thirty-one through bit twenty-four for byte three, bit thirty-nine through bit thirty-two for byte four, bit forty-seven through bit forty for byte five, bit fifty-five through bit forty-eight for byte six and bit sixty-three through bit fifty-six for byte seven. Thus, all available bits are used in the register. This storage arrangement increases the storage efficiency of the processor. Moreover, with eight data elements accessed, one operation can now be performed on eight data elements simultaneously. Signed packed byte in-register representation 311 illustrates the storage of a signed packed byte 201. Note that the eighth bit of every byte data element is the sign indicator.

Unsigned packed word in-register representation 312 illustrates how word three through word zero are stored in a register of multimedia registers 151, as illustrated in FIG. 3b. Bit fifteen through bit zero contain the data element information for word zero, bit thirty-one through bit sixteen contain the information for data element word one, bit forty-seven through bit thirty-two contain the information for data element word two and bit sixty-three through bit forty-eight contain the information for data element word three. Signed packed word in-register representation 313 is similar to the unsigned packed word in-register representation 312. Note that the sixteenth bit of each word data element is the sign indicator.

Unsigned packed doubleword in-register representation 314 shows how multi-media registers 151 store two double-word data elements, as illustrated in FIG. 3c. Doubleword zero is stored in bit thirty-one through bit zero of the register. Doubleword one is stored in bit sixty-three through bit thirty-two of the register. Signed packed doubleword in-register representation 315 is similar to unsigned packed doubleword in-register representation 314. Note that the necessary sign bit is the thirty-second bit of the doubleword data element.

Packed Data Instructions of the Invention

Referring now to FIGS. 4–10 the instructions of packed instruction set 140 are described in more detail. In each example described below, the operands are packed data located in multimedia registers 151. Alternate embodiments may access the operands and/or the results directly from memory 104. In other embodiments, these registers can be stored in a general purpose register file.

Figure 4:
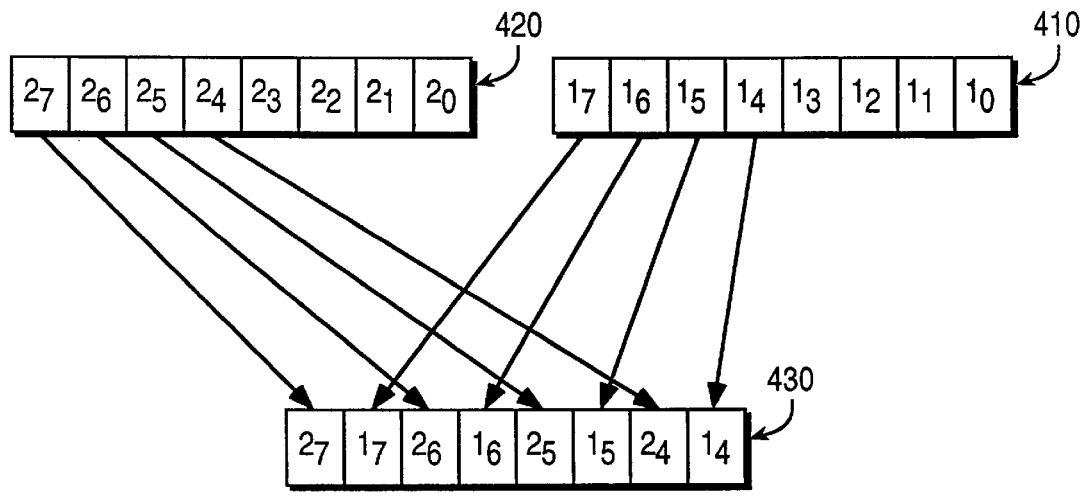
FIG. 4 illustrates the unpack High Packed data operation used in one embodiment in the method of the present invention.

FIG. 4 illustrates an example of the PUNPCKH 141 instruction. The instruction interleaves the high-order data elements of packed data sequences 410 and 420. It ignores the low order bytes, words, or double-word. The PUNPCKH 141 instruction is codified as PUNPCKHBW, PUNPCKHWD, and PUNPCKHDQ when interleaving bytes, words, and double-words, respectively. By choosing a packed data sequence filled with zeros as an operand, an unpacking of byte elements into word elements or word elements into double-word elements, is performed. FIG. 4 illustrates the PUNPCKH operation performed for the packed-bytes data elements.

Figure 5:
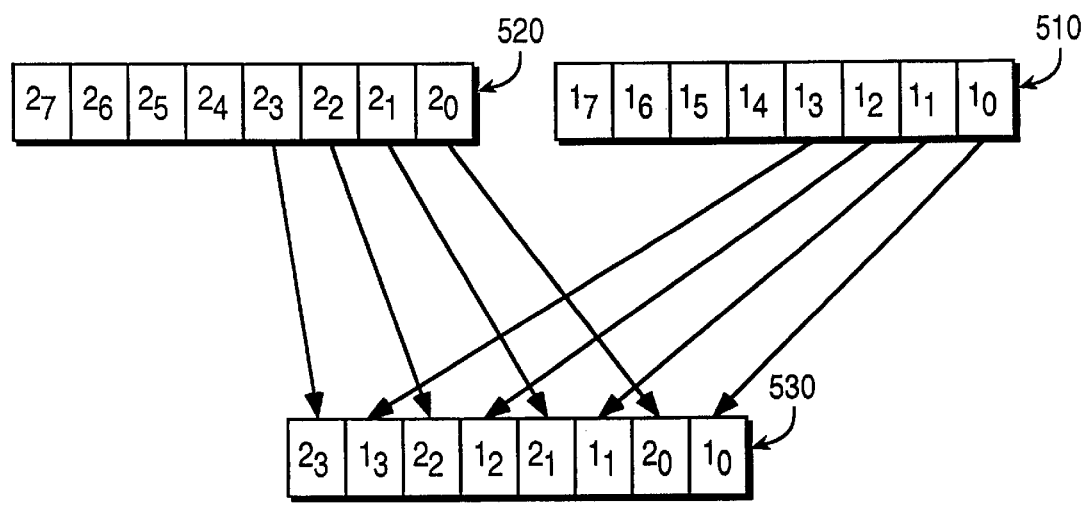
FIG. 5 illustrates the unpack Low Packed data operation used in one embodiment in the method of the present invention.

FIG. 5 illustrates an example of the PUNPCKL 142 instruction. The instruction interleaves the low-order data elements of packed data sequences 510 and 520. The PUNPCKL 142 instruction is codified as PUNPCKLBW, PUNPCKLWD, and PUNPCKLDQ when interleaving bytes, words, and double-words, respectively. When source data comes from 64-bit registers, the high order bytes, words or double-word are ignored. When unpacking from a memory operand, only 32 bits are accessed and all are utilized by the instruction. By choosing a packed data sequence to be filled with zeros, an unpacking of byte elements into word elements or word elements into double-word elements, is performed. FIG. 5 illustrates the PUNPCKL operation performed for the "packed-byte" data elements.

Figure 6:
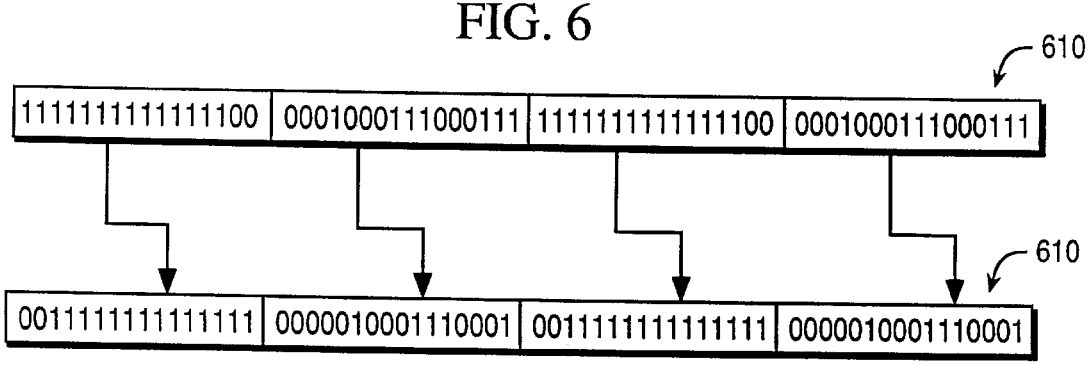
FIG. 6 illustrates the packed shift right logical operation used in one embodiment in the method of the present invention.

FIG. 6 illustrates the PSRL 143 instruction. The instruction independently shifts each data element of packed data sequence 610 to the right by the scalar shift count. In order to shift each individual packed word, double-word, or the entire packed data sequence, by the shift count, the PSRL 143 instruction is codified as PSRLW, PSRLD, or PSRLQ, respectively. The high-order bits of each element are filled with zero. The shift count is interpreted as unsigned. Shift counts greater than 15 (for words) 31 (for doublewords) or 63 (otherwise) yield all zeros.

The PSLL 144 instruction is performed in the same manner as the PSRL 143 instruction. In the PSLL 144 instruction, each data element is independently shifted to the left by scalar shift count. Moreover, the lower order bits of each element are filled with zeros. In order to shift each individual packed word, or double-word, by the shift count, the PSLL 141 instruction is codified as PSLLW and PSLLD, respectively.

Figure 7:
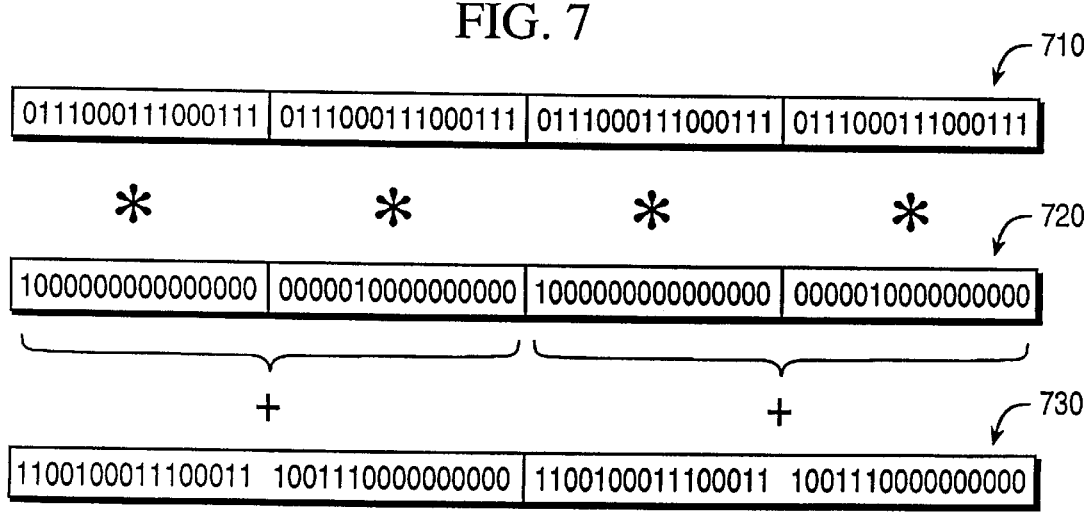
FIG. 7 illustrates the packed multiply and add operation used in one embodiment in the method of the present invention.

FIG. 7 illustrates the PMADD 145 operation. In the PMADD 145 operation, the signed data elements of packed data sequence 710 are multiplied with the corresponding signed data elements of the packed data sequence 720. The 32-bit intermediate results are summed by pairs producing two 32-bit integers. In cases which overflow, the results are truncated. These two integers are packed into the corresponding elements of packed data sequence 730.

FIG. 8 illustrates the POR 146 operation. In the POR 146 operation a bit-wise logical OR is performed on packed data sequence 810 and 820. The result is placed in packed data sequence 830 as illustrated in FIG. 8.

FIG. 9 illustrates the PAND 147 instruction. In the PAND 147 instruction a bit-wise logical AND is performed on register 910 and 920. The results are placed in register 930 as illustrated in FIG. 9.

Figure 10:
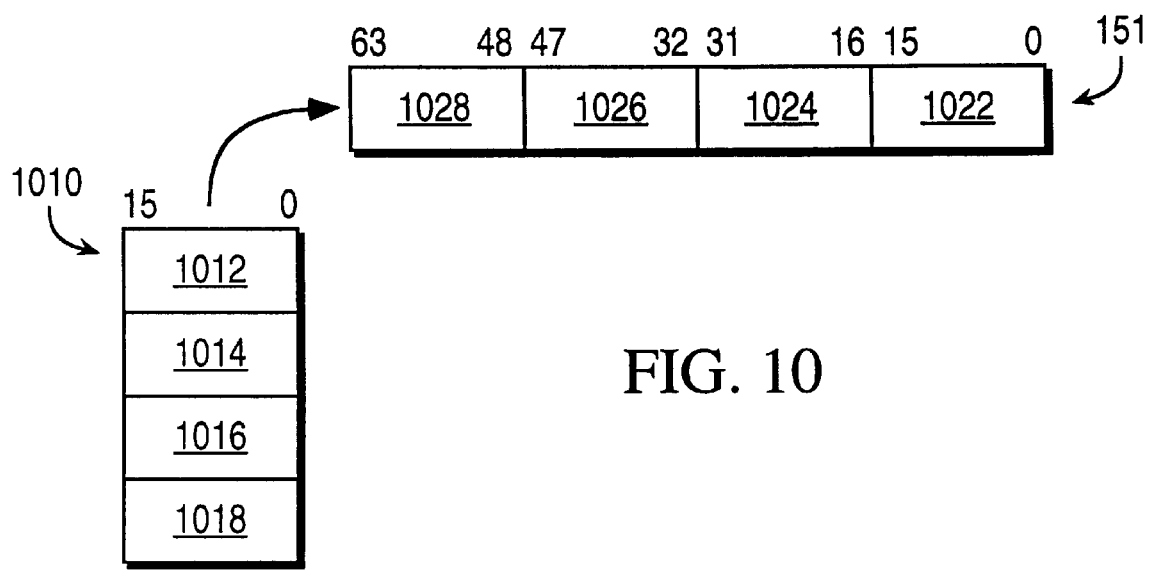
FIG. 10 illustrates the MOVQ operation used in one embodiment in the method of the present invention.

FIG. 10 illustrates an example of the MOVQ 148 instruction. The MOVQ 148 instruction is used to transfer sixty-four data bits, four packed words, to and from the multimedia registers 151. As shown in FIG. 10, packed data 1010, having packed words 1012, 1014, 1016, and 1018 located in memory are transferred to a register of multimedia registers 151, and stored as data elements 1022, 1024, 1026, and 1028, respectively.

Method of Compressing Pixel Bits

As previously mentioned, the invention relates to a novel and accelerated method of compressing 48-bit pixel formats, generated by a graphics pipeline, into 16-bit pixel format. In particular, the invention involves a unique method of using data values in a 64-bit packed data sequence, and unique packed data instructions to provide a faster and more efficient method of compressing the 48-bit pixels into 16-bit pixels.

More specifically, the performance advantage is achieved by providing the 48-bit pixel in one 64-bit packed data sequence stored in one register. As a result, the data elements of the packed data sequence, representing the separate colors, can be processed simultaneously in response to single instructions. Furthermore, by initially providing the red, green, and blue colors in one register, the additional loading and copying instructions necessary to operate on red, green, and blue colors provided in separate registers are avoided, thereby completing the compression of the 48-bit pixels in less instructions.

Figure 12A:
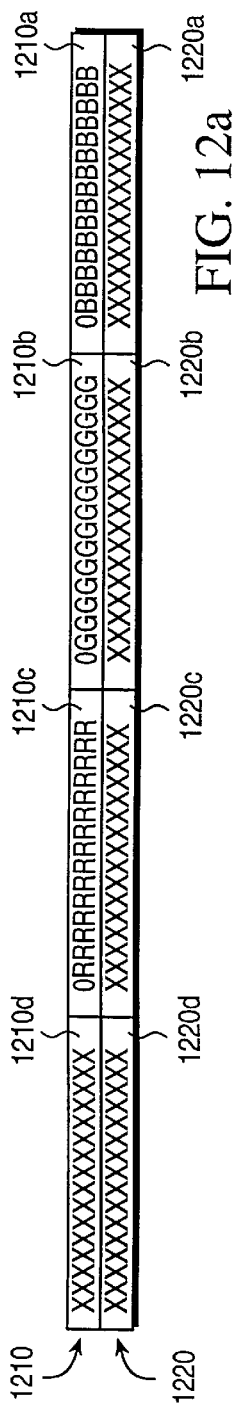
FIG. 12 illustrates a block diagram of the steps used in one embodiment of the method of the present invention.

As illustrated below in Table 1, one pixel is presented within a single register as a packed data sequence, with each color occupying a separate 16-bit field (packed word) within the register. Although storing each color in a separate packed word appears to be inefficient, it is necessary because the method of the present invention is designed to accept colors from a graphics pipeline, which generates red, green, and blue colors as 16 bits. A typical register containing a 48-bit pixel would be represented as shown in Table 1:

The steps for one embodiment of the invention are illustrated in the block diagram of FIG. 11, and further illustrated as in-register 151 representations in FIGS. 12a–12g. As illustrated in FIG. 12a, register 1210 contains a 48 pixel bit color and register 1220 is used as a scratch register. FIG. 12a shows a blue color in packed word 1210a, a green color in packed word 1210b, and a red color in packed word 1210c.

Figure 12B:
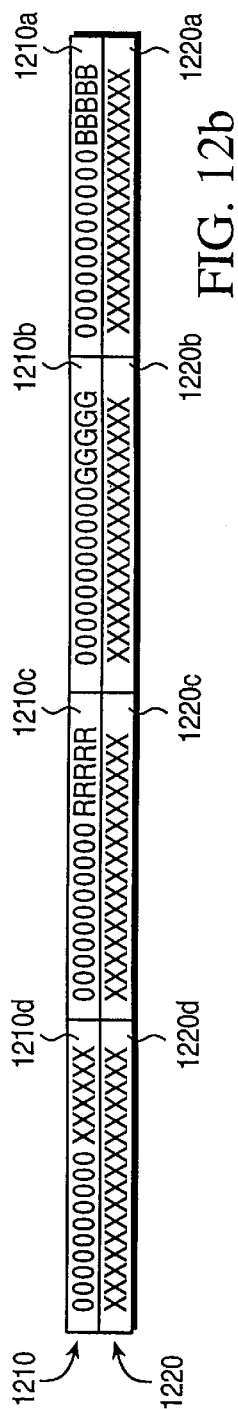

Starting with processing block 1110, a predetermined portions of each color in register 1210 are masked out to zero, using the PAND 147 instruction, leaving only the bits of each color which will end up in the final 16-bit pixel format, as illustrated in FIG. 12b.

Figure 12C:
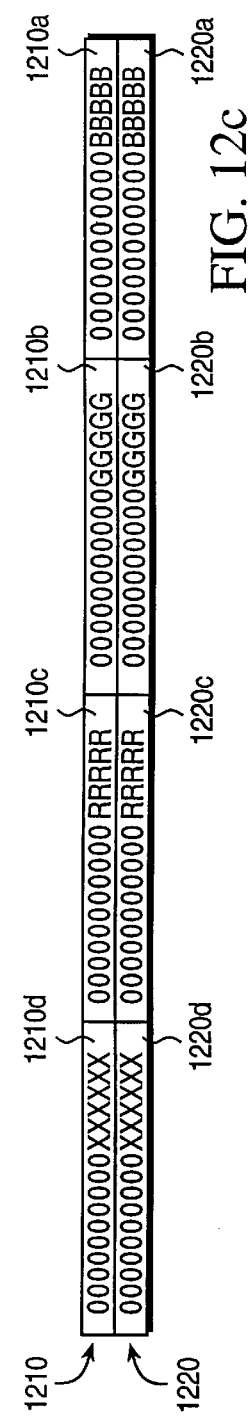
Figure 12D:
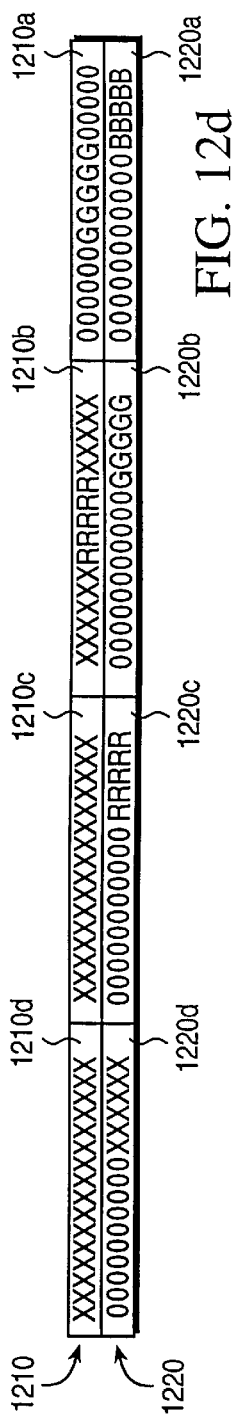

In processing block 1120, the contents of the register 1210 are copied to register 1220 by using a MOVQ instruction, as illustrated in FIG. 12c. In processing block 1130, the entire contents of register 1210 are shifted to the right by 11 bit positions, by use of the PSRLQ instruction. As illustrated in FIG. 12d, the green color in register 1210 is shifted into alignment with the blue color of register 1220. As a result, the least significant bit of the green color of register 1210 occupies the bit position adjacent to the most significant bit position of the blue color of register 1220.

In processing block 1140, a bit-wise OR operation is performed between registers 1210 and 1220, using the POR instruction. As illustrated in FIG. 12e, the packed word 1220a will contain the green and blue colors.

In processing block 1150, the contents of the register 1210 are again shifted by 11 bit positions, by using the PSRLQ instruction. As illustrated in FIG. 12f, the red color in register 1210 is shifted into alignment with the green color of register 1220. The least significant bit of the red color of register 1210 then occupies the bit position adjacent to the most significant bit position of the green color of register 1220.

In the final processing block 1160, a second bit-wise OR operation is performed between registers 1210 and 1220, using the POR instruction. As a result, the packed word 1220a will contain the red, green, and blue colors of a pixel in the compressed 16-bit pixel format, so as to be displayed on a monitor.

Figure 13A:
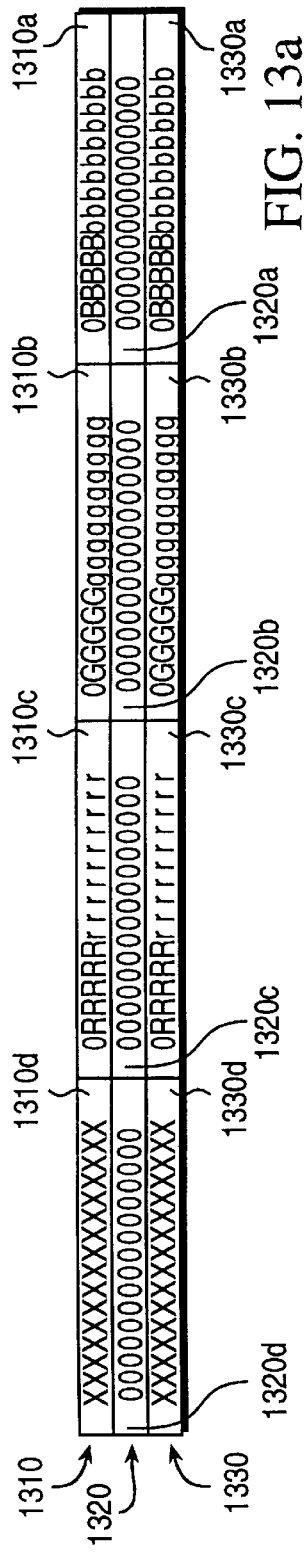
FIG. 13 illustrates in-register packed data representation of the steps used in a second embodiment of the method of the present invention.

The steps for a second embodiment of the invention are illustrated as in-register representations in FIGS. 13a–13i and the block diagram of FIG. 14. As illustrated in FIG. 13a, register 1310 contains a 48-bit pixel, register 1320 is used as a scratch register, and register 1330 contains a second 48-bit pixel. As further shown in FIG. 13a, registers 1310 and 1330

TABLE 1

| XXXXXXXXXXXXXXXX | 0rrrrrrrrrrRRRRR | 0gggggggggggGGGGG | 0bbbbbbbbbbbBBBBB |

*0 = The most significant bit is a signed bit and is kept zero.
*Upper Case Bits will end up in 16 bit pixel format
*Lower Case Bits are part of 48-bit pixel but will be removed during compression.
*X = insigificant bits As illustrated in Table 1, it is assumed that the 48-bit pixels are located in the low 48-bits of the 64-bit register.

In one embodiment, the goal of the compression method is the bit pattern RRRRRGGGGGBBBBB located somewhere in the 64-bit register, typically right justified to the end of the register stored in one packed word. The remaining contents of the register are irrelevant to the compression method.

show a blue color in packed words 1310a and 1330a, a green color in packed words 1310b and 1330b, and a red color in packed words 1310c and 1330c.

Figure 13B:
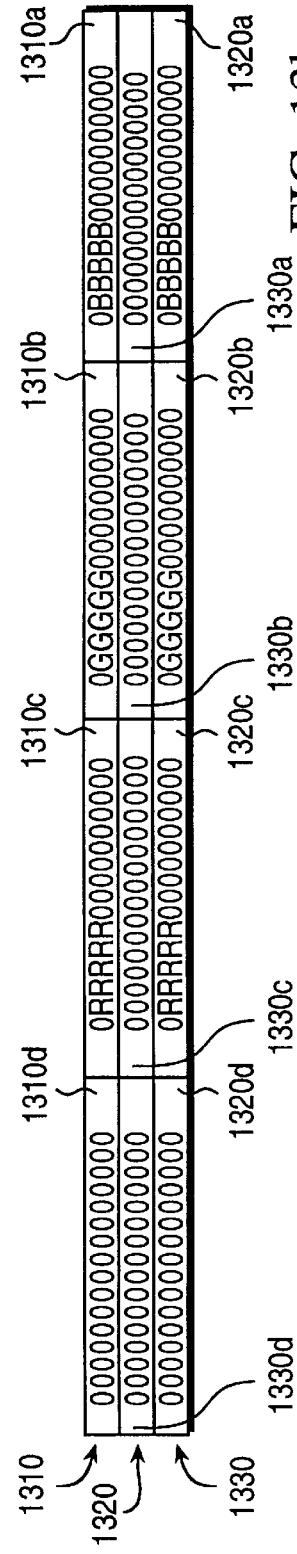

Starting with processing block 1410, a predetermined portions of each color in register 1310 and 1330 are masked out to zero, using the PAND 147 instruction, leaving only the bits of each color which will be used in the final 16-bit pixel format, as illustrated in FIG. 13b.

Figure 13C:
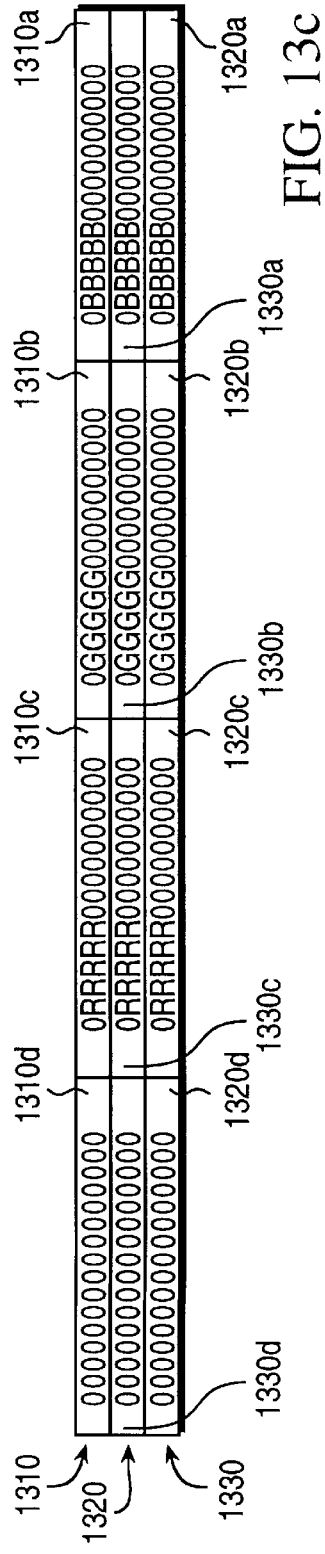
Figure 13D:
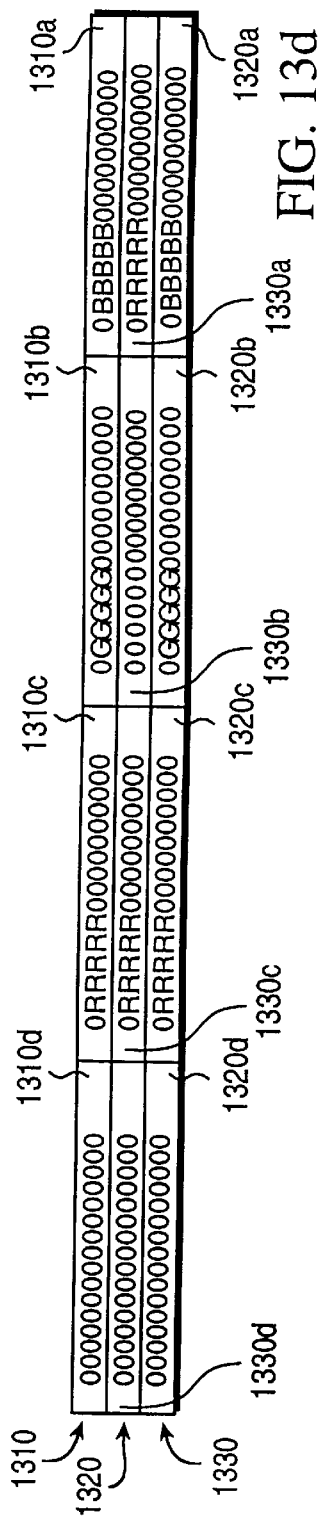

In processing block 1420, the contents of the register 1310 are copied to register 1320 by using a MOVQ instruction, as illustrated in FIG. 13c. In processing block 1430, the high 32 bits of register 1320 are moved to the low half of register 1320. The high 32 bits of register 1330 are placed in the upper half of the register 1320. The operation is done using the PUNPCKHDQ instruction. As illustrated in FIG. 13d, register 1320 contains the red color from register 1310 in the lower half of register 1320, stored in packed word 1320a, and the red color from register 1330 placed in the upper half of register 1320, stored in packed word 1320c. Packed words 1320d and 1320b contain zeros.

Figure 13E:
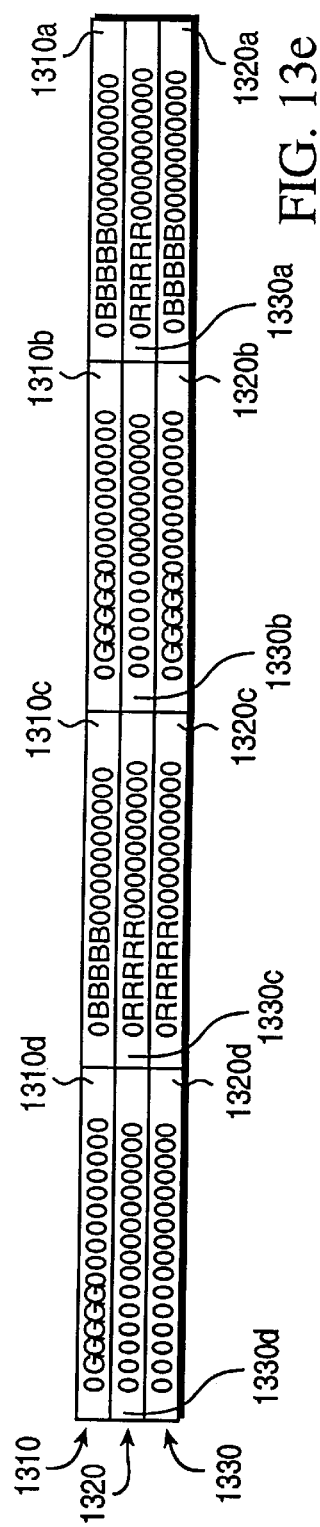

In processing block 1440, packed words 1330a and 1330b replace packed words 1310d and 1310c. The procedure is done using a PUNPCKLDQ instruction. As illustrated in FIG. 13e, register 1310 then contains the green and blue colors from the first packed data sequence, stored in packed words 1310a and 1310b, respectively, and the green and blue colors from register 1330, stored in packed words 1310c and 1310b, respectively.

In processing block 1450, the green colors in register 1310, stored in packed words 1310b and 1310d, respectively, are shifted to be adjacent to the blue colors stored in packed words, 1310a and 1310c. The shifting is performed using a PMADD instruction so as not to shift or effect the blue colors stored in the packed words 1310a and 1310c. More specifically, the multiplier designated by the PMADD instruction is a packed data sequence containing four packed words corresponding to the packed words of register 1310 of FIG. 13e. The multiplier includes a first and third packed word having an integer value of one to be multiplied with the blue colors in packed words 1310a and 1310c, thereby generating products representing the original packed words 1310a and 1310c unshifted in the respective 32-bit product.

Consider the following example:

```
        0BBBBB0000000000
x       0000000000000000

= 0000000000000000BBBBB0000000000
  (1st intermediate result of PMADD)
```

The multiplier also includes second and fourth packed words having integer values of 25 to be multiplied with the green colors stored in packed words 1310b and 1310d. The generated products respectively represent the green colors shifted to the left by five bit positions in the 32-bit products.

Consider the following example:

```
        0GGGGG0000000000
x       0000000000011111

= 000000000000GGGGG000000000000000
  (2nd intermediate result of PMADD)
```

Prior to execution of the PMADD operation, the most significant bit of each packed word should be 0 because the PMADD instruction is a signed operation. The color value, however, can sit anywhere else within the 16 bits of the packed words.

Figure 13F:
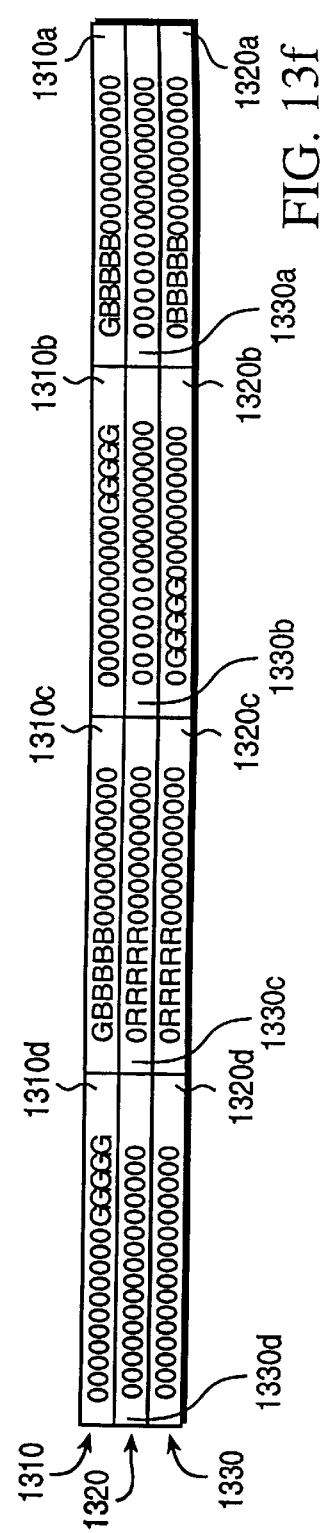

The add operation of the PMADD instruction is then used to OR the Green and Blue colors in adjacent packed words. The final result of register 1310, as shown in FIG. 13f, provide two sets of adjacent green and blue colors.

Consider the following example:

```
  0000000000000000BBBBB0000000000
+ 000000000000GGGGG000000000000000

= 000000000000GGGGGBBBBB0000000000
  (Final 32 result of PMADD)
```

In processing block 1460, the double words of the register 1320 are each shifted left by 10 bit positions, by using the PSLLD instruction. As a result, the red colors in register 1320 are each shifted into alignment with the green color of register 1310, wherein the least significant bit of the red colors occupy the bit position adjacent to the most significant bit position of the green colors of register 1310, as illustrated in FIG. 13g.

In processing block 1470, a bit-wise OR operation is performed between registers 1310 and 1320, using the POR instruction, to join the red colors with the respective green and blue colors. As a result, the red, green, and blue colors will be combined in register 1310, wherein each pixel is compressed to its target size of 15 bits, each stored in separate dwords, as illustrated in FIG. 13h. A final processing block 1480 right shifts each pixel into one packed word by executing a PSRLD, as illustrated in FIG. 13i.

From the above description, it will be apparent that the invention disclosed herein provides a novel, accelerated, and advantageous computer implemented method of compressing 48-bit pixels generated by a graphics pipeline into 16-bit pixels. As will be understood by those familiar with the art, the invention may be embodied in other specific forms without departing from its essential features, and thus, the described embodiments are not restrictive of the scope of the invention. The following claims are indicative of the scope of the invention, and all variations which come within the meaning and range of equivalency of the claims are to be embraced within their scope.

What is claimed is:

1. In a computer system a method for compressing bit formats in a first packed data sequence, said method comprising the steps of:

masking, in response to executing a single first instruction, multiple data elements of said first packed data sequence, in parallel;

generating, in response to executing a single second instruction, a second packed data sequence by copying said multiple data elements of said first packed data sequence, in parallel;

performing a first shift operation, in response to executing a single third instruction, by independtly shifting each of said multiple data elements of said first packed data sequence, in parallel;

generating, in response to executing a single fourth instruction, an intermediate result by joining said first and second packed data sequences, in parallel;

performing a second shift operation, in response to executing a single fifth instruction, by independently shifting each of said multiple data elements of said first packed data sequence, in parallel; and generating, in response to executing a single sixth instruction, a final result by joining said first packed data sequence and said intermediate result, in parallel.

2. The method of claim 1, wherein said first packed data sequence includes a first, second, and third datum, each placed in separate packed words; and said final result including one packed word representing said three datums.

3. The method of claim 2, wherein said three datums are represented in adjacent packed words in said first and second packed data sequences.

4. The method of claim 3, wherein said first shift operation further includes shifting said second datum to a bit position adjacent to a most significant bit position of said first datum in said second packed data sequence.

5. The method of claim 4, wherein said intermediate result includes a first packed word having said first and second datums in one packed word; and said shift operation further includes shifting said third datum, in said first packed data sequence, to a bit position adjacent to a most significant bit position of said first and second datums in said first packed word of said intermediate results.

6. The method of claim 5, wherein said first, second, and third datums jointly represent a pixel, wherein each of said datums represents a color.

7. The method of claim 6, wherein said datums are generated by a graphics pipeline.

8. A machine-readable medium having stored thereon data representing sequences of instructions for compressing bit formats in a first packed data sequence, said sequences of instruction which, when executed by a processor, cause said processor to perform the steps of:

masking, in response to executing a single first instruction, multiple data elements of said first packed data sequence, in parallel;

generating, in response to executing a single second instruction, a second packed data sequence by copying said first packed data sequence;

performing a first shift operation, in response to executing a single third instruction, by independently shifting each of said multiple data elements of said first packed data sequence, in parallel;

generating, in response to executing a single fourth instruction, an intermediate result by joining said first and second packed data sequences;

performing a second shift operation, in response to executing a single fifth instruction, by independently shifting each of said multiple data elements of said first packed data sequence, in parallel; and generating, in response to executing a single sixth instruction, a final result by joining said first packed data sequence and said intermediate result.

9. The machine-readable medium of claim 8, wherein said first packed data sequence includes a first, second, and third datum, each placed in separate packed words; and said final result including one packed word representing said three datums.

10. The machine-readable medium of claim 9, wherein said three datums are represented in adjacent packed words in said first and second packed data sequences.

11. The machine-readable medium of claim 10, wherein said first shift operation further includes shifting said second datum to a bit position adjacent to a most significant bit position of said first datum in said second packed data sequence.

12. The machine-readable medium of claim 11, said intermediate result includes a first packed word having said first and second datums in a first packed word; and said second shift operation further includes shifting said third datum, in said first packed data sequence, to a bit position adjacent to a most significant bit position of said first and second datums in said first packed word of said intermediate results.

13. The machine-readable medium of claim 12, wherein said first, second, and third datums jointly represent a pixel, wherein each of said datums represent a color.

14. The machine-readable medium of claim 13, wherein said datums are generated by a graphics pipeline.

15. A computer-implemented method for compressing bit formats in a first packed data sequence and a second packed data sequence, said method comprising:

generating a third packed data sequence having a first portion of said first packed data sequence and a first portion of said second packed data sequence;

replacing said first portion of said first packed data sequence with a second portion of said second packed data sequence;

shifting, in response to executing a single first instruction, selected data elements of said first packed data sequence;

shifting said third packed data sequence; and generating a final result by joining said first and third packed data sequences.

16. The method of claim 15, wherein said first packed data sequence includes a first, second, and third datums, each placed in separate packed words, and said second packed data sequence further includes a fourth, fifth, and sixth datums, each placed in separate packed words; and said final result includes a first packed word representing said first, second, and third datums, and further includes a second packed word representing said fourth, fifth, and sixth datums.

17. The method of claim 16, wherein prior to performing the step of generating said third packed data sequence, performing the steps of:

masking a portion of said first packed data sequence, wherein said first, second, and third datums are truncated to a target size, and masking a portion of said second packed data sequence, wherein said fourth, fifth, and sixth datums are truncated to a target size.

18. The method of claim 17, wherein said step of shifting in response to a single first instruction includes generating an intermediate result, by multiplying data elements of said first packed data sequence with corresponding data elements of a fourth packed data sequence, and adding adjacent products.

19. The method of claim 18, wherein said adding of adjacent products in said step of generating said intermediate result, includes performing a bit-wise logical OR operation between adjacent products.

20. The method of claim 19, wherein said first, second, and third datums jointly represent a first pixel, and said fourth, fifth, and sixth datums, jointly represent a second pixel, wherein each of said datums represent a color.

21. The method of claim 20, wherein said datums are generated by a graphics pipeline.

22. A machine-readable medium having stored thereon data representing sequences of instructions for compressing bit formats in a first packed data sequence and a second packed data sequence, said sequences of instruction which, when executed by a processor, cause said processor to perform the steps of:

generating a third packed data sequence having a first portion of said first packed data sequence and a first portion of said second packed data sequence;

replacing said first portion of said first packed data sequence with a second portion of said second packed data sequence;

shifting, in response to executing a single first instruction, selected data elements of said first packed data sequence;

shifting said third packed data sequence; and generating a final result by joining said first and third packed data sequences.

23. The machine-readable medium of claim 22, wherein said first packed data sequence includes a first, second, and third datum, each placed in separate packed words, and said second packed data sequence further includes a fourth, fifth, and sixth datum, each placed in separate packed words; and said final result includes a first packed word representing said first, second, and third datums, and further includes a second packed word representing said fourth, fifth, and sixth datums.

24. The machine-readable medium of claim 23, wherein prior to performing the step of generating said third packed data sequence, performing the steps of:

masking a portion of said first packed data sequence, wherein said first, second, and third datums are truncated to a target size, and masking a portion of said second packed data sequence, wherein said fourth, fifth and sixth datums are truncated to a target size.

25. The machine-readable medium of claim 24, wherein said step of shifting in response to a single first instruction includes generating an intermediate result, by multiplying data elements of said first packed data sequence with corresponding data elements of a fourth packed data sequence, and adding adjacent products.

26. The machine-readable medium of claim 25, wherein said adding of adjacent products in said step of generating said intermediate results, includes performing a bit-wise logical OR operation between adjacent products.

27. The machine-readable medium of claim 26, wherein said first, second, and third datums jointly represent a first pixel, and said fourth, fifth, and sixth datums, jointly represent a second pixel, wherein each of said datums represent a color.

28. The machine-readable medium of claim 27, wherein said datums are generated by a graphics pipeline.

29. In a computer system a method for compressing bit formats in a first packed data sequence, said method comprising the steps of:

generating a second packed data sequence, in response to executing a single MOVQ instruction, by copying said first packed data sequence;

performing a first shift operation, in response to executing a single PSRLQ instruction, by independently shifting each of said multiple data elements of said first packed data sequence, in parallel;

generating an intermediate result, in response to executing a single POR instruction, by performing a bit wise logical OR operation between said first and second packed data sequences;

performing a second shift operation, in response to executing a single PSRLQ instruction, by independently shifting each of said multiple data elements of said first packed data sequence, in parallel;

generating a final response to executing a single POR instruction, by performing a bit wise logical OR operation between said first packed data sequence and said intermediate result.

30. A computer-implemented method for compressing bit formats in a first packed data sequence and a second packed data sequence, said method comprising:

generating a third packed data sequence, in response to executing a single MOVQ instruction, by copying said first packed data sequence;

replacing a low double packed word of said third packed data sequence with a high double packed word of said third packed data sequence, and replacing said high double packed word of said third packed data sequence with a high double packed word of said second packed data sequence, in response to executing a single PUNPCKDQ instruction;

generating an intermediate result, in response to executing a single PMADD instruction, by multiplying data elements of said first packed data sequence with corresponding data elements of a fourth packed data sequence, and adding adjacent products;

shifting said third packed data sequence, in response to executing a single PSLLD instruction;

generating a final result, in response to executing a single POR instruction, wherein a bit wise logical OR operation is performed between said third packed data sequence and said intermediate result.

31. A computer-implemented method for compressing bits, said method comprising:

masking a portion multiple data elements of a first packed data sequence, in parallel;

generating a second packed data sequence by copying said first packed data sequence, in parallel;

performing a first shift operation by independently shifting each of said multiple data elements of said first packed data sequence, in parallel;

generating an intermediate result by joining said first and second packed data sequences;

performing a second shift operation by independently shifting each of said multiple data elements of said first packed data sequence, in parallel; and generating a final result by joining said first packed data sequence and said intermediate result.

32. The method of claim 31, wherein said first packed data sequence includes a first, second, and third datum, each placed in separate packed words; and said final result including one packed word representing said three datums.

33. The method of claim 32, wherein said three datums are represented in adjacent packed words in said first and second packed data sequences.

34. The method of claim 33, wherein said first shift operation further includes shifting said second datum to a bit position adjacent to a most significant bit position of said first datum in said second packed data sequence.

35. The method of claim 34, wherein said intermediate result includes a first packed word having said first and second datums in one packed word; and said shift operation further includes shifting said third datum, in said first packed data sequence, to a bit position adjacent to a most significant bit position of said first and second datums in said first packed word of said intermediate results.

36. The method of claim 35, wherein said first, second, and third datums jointly represent a pixel, wherein each of said datums represents a color.

37. The method of claim 36, wherein said datums are generated by a graphics pipeline.

* * * * *